United States Patent [19]

Matus

[11] Patent Number: 5,440,098

[45] Date of Patent: Aug. 8, 1995

[54] GAS CYLINDER LIFTING SYSTEM

[75] Inventor: Tim A. Matus, Appleton, Wis.

[73] Assignee: Miller Electric Manufacturing Co., Appleton, Wis.

[21] Appl. No.: 173,159

[22] Filed: Dec. 23, 1993

[51] Int. Cl.⁶ .................. B23K 9/32; B62D 43/00
[52] U.S. Cl. ..................... 219/136; 414/466
[58] Field of Search ............. 219/136, 130.1; 254/1, 254/2 R, 2 C; 414/466, 469; 280/43.12

[56] References Cited

U.S. PATENT DOCUMENTS

| | | | |
|---|---|---|---|
| 3,237,051 | 2/1966 | Schober | 219/130.1 |
| 3,471,046 | 10/1969 | Hess | 414/469 |
| 3,682,342 | 8/1972 | Evans | 254/2 R |
| 4,021,070 | 5/1977 | Shea | 414/466 |
| 4,536,123 | 8/1985 | Snyder | 254/2 R |
| 4,738,582 | 4/1988 | Roberts | 414/469 |

Primary Examiner—Clifford C. Shaw
Attorney, Agent, or Firm—Donald Cayen

[57] ABSTRACT

A gas cylinder lifting system is useful for loading and unloading heavy tanks of gases onto and off of a welding power supply running gear. The gas cylinder lifting system comprises one or more sliders that are constrained for vertical reciprocation on a frame mounted to the running gear. The slider includes a pan for supporting a gas cylinder. A crank lever is pivotally mounted to the frame by a pivot pin, and a linkage is pivotally connected between the crank lever and the slider. The linkage has a crook in it. Pivoting the crank lever to a first angular position lowers a slider and places the linkage crook remote from the pivot pin. Rotating the crank lever to a second angular position raises the slider and places the linkage crook adjacent the pivot pin. The crank lever and linkage cooperate to place the gas cylinder lifting system in an over-center self-locked condition when the crank lever is in its second angular position. A spring-loaded latch may be installed on the frame that positively maintains the crank lever at its second angular position but that is manually operable to enable the crank lever to rotate to its first angular position.

27 Claims, 7 Drawing Sheets

GAS CYLINDER LIFTING SYSTEM

BACKGROUND OF THE INVENTION

1. Field of the Invention

This invention pertains to lifting devices and more particularly to apparatus for raising heavy objects a short distance above a horizontal surface.

2. Description of the Prior Art

It is a common practice in the arc welding industry to mount a welding power supply to a running gear. The running gear enables the welding power supply to be transported with ease to different jobs in an area. The running gears are normally steerable, which aids in maneuvering them to the desired locations.

It is further well known to carry one or more large cylinders of inert arc-shielding gases on the running gears. The gas cylinders are very heavy, often weighing as much as 180 pounds. The gas inside the cylinders is under very high pressure, as, for example, 2,000 pounds per square inch. At the top of the cylinder is a valve, which is protected by a removable cover. The gas cylinders are normally supported on a sturdy horizontal pan on the back end of the running gear. The pan is located a few inches above the floor. In that manner, the welding power supply and the gas cylinders are transportable together by the running gear.

It has long been a major problem to load the gas cylinders onto and unload them from the running gear pan. Overhead cranes are rarely available at the cylinder storage area. Consequently, the usual loading and unloading method has been to manually lift the cylinders. A person hugs a cylinder, wrapping his arms around it, and lifts it by using his back and/or legs. Another prior solution has been to tip the cylinder away from the running gear pan such that the cylinder bottom surface is in contact with the edge of the pan. The cylinder is then tilted to the upright position, partially supported on the pan, and the cylinder is slid fully onto the pan.

Both prior solutions are far from satisfactory. Direct lifting has the potential for causing serious injury to the person. Tilting the cylinder presents the risk of the cylinder slipping and striking a fixed structure with the valve cover or the valve itself. Damage to the valve creates a danger because of the high gas pressure inside the cylinder.

In a few situations, it may be possible to tip the running gear such that the edge of the pan is on or close to the floor, and then tip and slide the cylinder up onto the pan. However, that solution is impractical for the great majority of cases.

Thus, a need exists for a way to safely load gas cylinders onto and unload them from welding power supply running gears.

SUMMARY OF THE INVENTION

In accordance with the present invention, a gas cylinder lifting system is provided that lifts and lowers heavy objects in a safe and easy manner. This is accomplished by apparatus that includes a self-locking slider-crank mechanism.

The slider-crank mechanism comprises a slider that is constrained to reciprocate vertically within a frame. The slider includes a pan that can support a heavy object. A crank lever is rotatably connected to the frame. A linkage is pivotally connected between the crank lever and the slider. By manually rotating the crank lever, the slider undergoes vertical linear movement. Thus, oscillating the crank lever causes the slider to raise and lower along the frame.

The gas cylinder lifting system is designed such that when the crank lever is at a first angular position the slider pan is close to a horizontal surface. A heavy object can then be moved from the horizontal surface onto the slider pan. The crank lever is rotated to a second angular position, thereby raising the slider and object to a raised location above the horizontal surface.

It is a feature of the present invention that the gas cylinder lifting system is in an over-center self-locking condition when the crank lever is in its second angular position and the slider and object are at their raised location. The over-center self-locking condition is achieved by forming the linkage with two legs that join each other at an angle. When the crank lever is in its second angular position, the junction of the linkage legs is adjacent the pivotal connection between the crank lever and the frame, with the linkage junction and the connection between the linkage and the crank lever lying on opposite sides of the connection between the crank lever and the frame. In that situation, the weight of the object does not cause the slider to lower or the crank lever to rotate. On the contrary, the weight of the object actually serves to more firmly hold the crank lever in its second angular position and thus maintain the slider and object at their raised location. Only by intentionally rotating the crank lever back toward its first angular position can the slider be lowered from its raised location.

According to another aspect of the invention, a stop is employed that positively maintains the slider and object at their raised location. The stop comprises a spring-loaded latch installed on the top of the frame and in the path of the crank lever. As the crank lever is rotated toward its second angular position, an end of the crank lever contacts the latch and cams it out of the crank lever path. When the crank lever is at its second angular position, it has passed out of contact with the latch. The spring then pivots the latch back into the path of the crank lever. Reverse rotation of the crank lever toward its first angular position is positively prevented by the latch until a person intentionally pivots the latch out of the crank lever path.

The method and apparatus of the invention, using a slider-crank mechanism, thus enables heavy objects to be raised and lowered with minimum effort applied to the crank lever. The invention includes a self-locking feature that keeps the slider and object at a raised location without maintaining any manual force on the crank lever.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
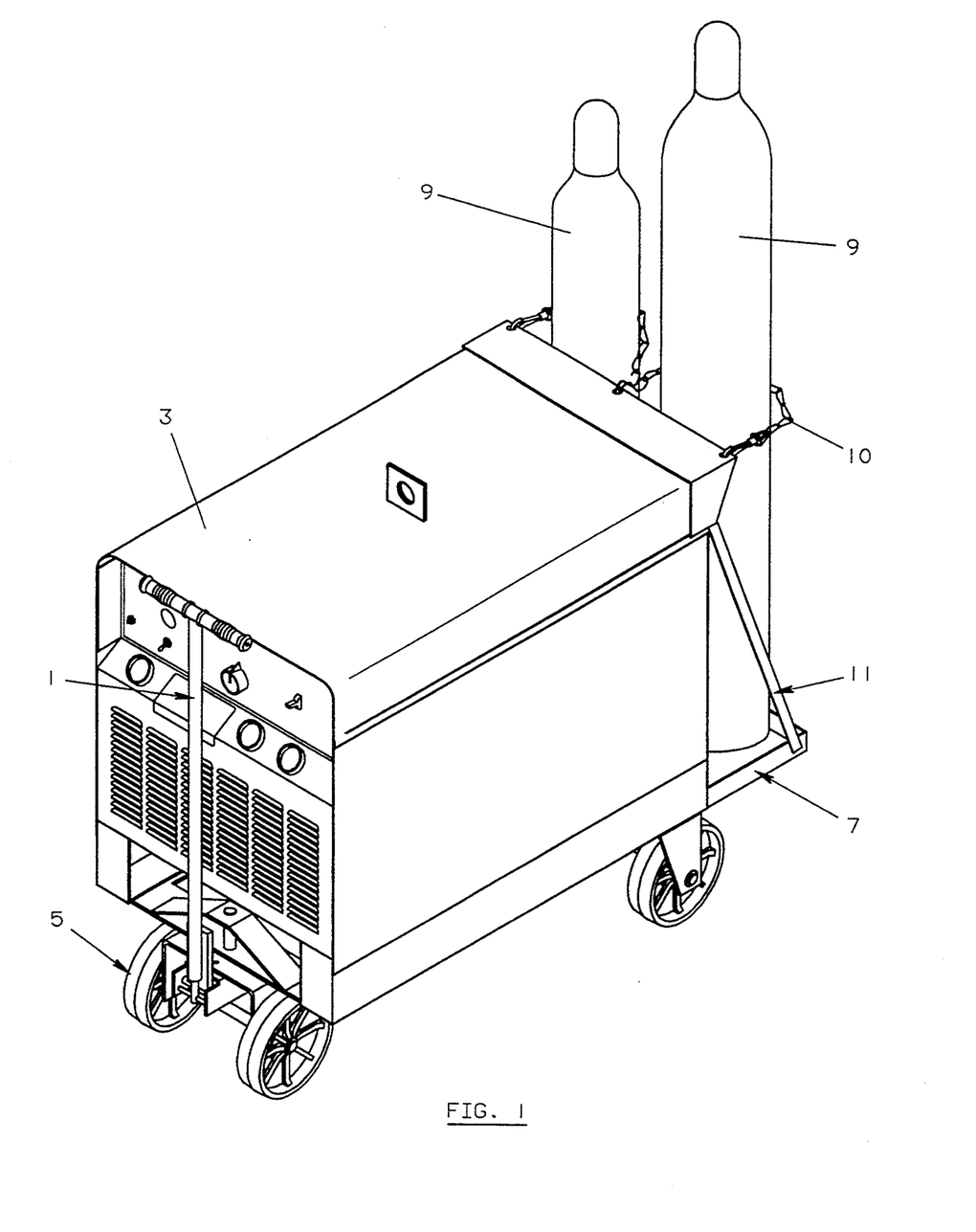
FIG. 1 is a perspective view of a typical welding power supply and running gear that advantageously include the gas cylinder lifting system of the present invention.

Referring to FIG. 1, a running gear 1 for a welding power supply 3 is illustrated. The particular running gear 1 and welding power supply 3 shown are merely representative of a wide variety of such equipment that is currently in widespread use. The welding power supply can be of any size and shape that suits the particular welding system with which it is used. Similarly, the running gear is designed to fit a particular welding power system. The running gear enables the heavy welding power supply to be transported between job sites with ease. Typically, the running gear comprises a front steering unit 5 that is attached to one end of the welding power supply and a fixed-wheel back unit 7 that is attached to the other end of the welding power supply.

Figure 2:
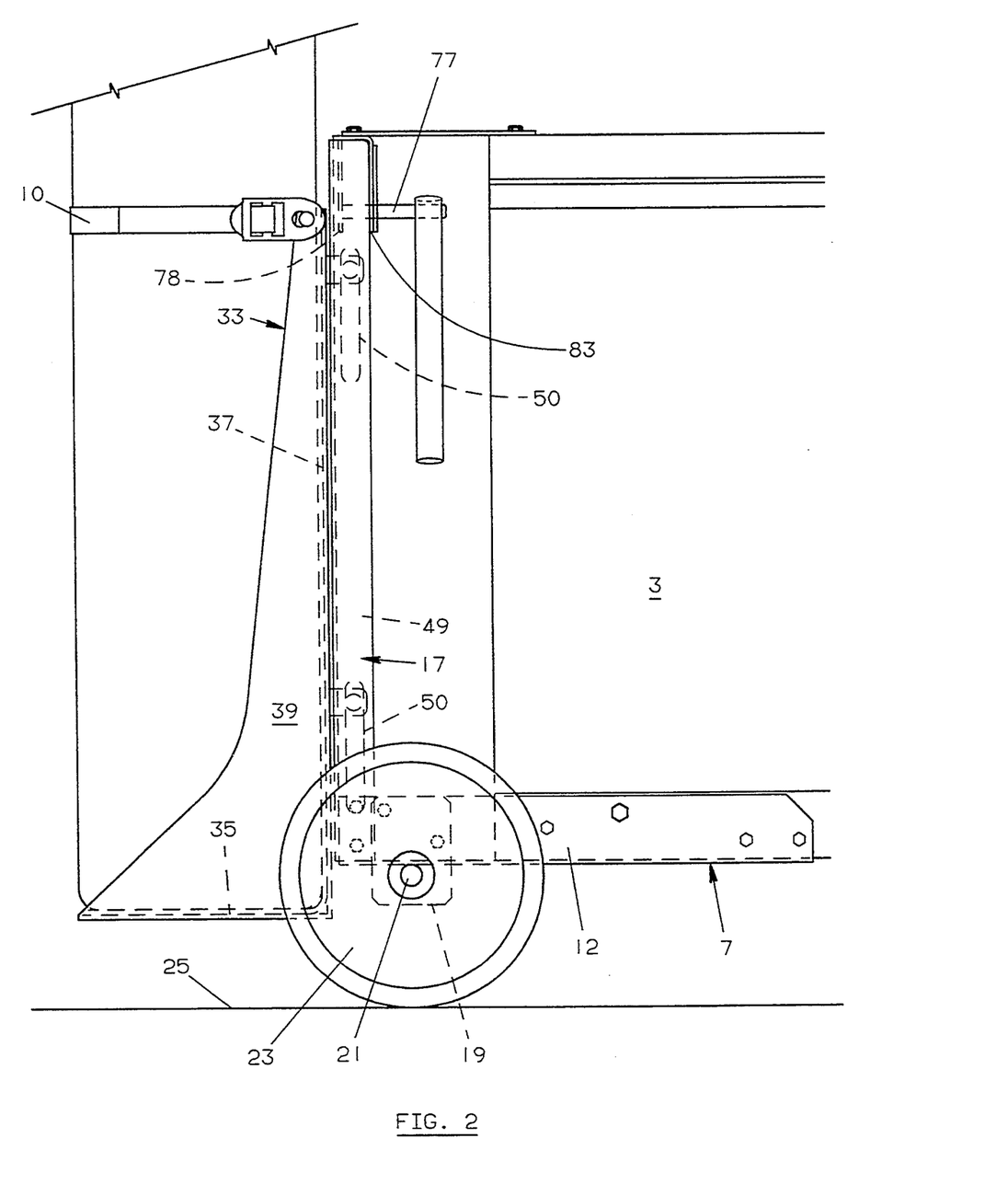
FIG. 2 is a side view of the gas cylinder lifting system of the present invention.

In accordance with the present invention, the back unit 7 of the running gear 1 includes a gas cylinder lifting system 11 that enables heavy gas cylinders 9 to be easily loaded and unloaded from the running gear. Looking also at the FIGS. 2-4, the running gear back unit comprises a pair of spaced beams 12 that are mounted to and extend horizontally from the welding power supply 3. The beams 12 include shims 19 that support an axle 21. Rotatably supported on the axle 21 are wheels 23 that cooperate with the running gear front unit 5 to roll the welding power supply along a floor 25.

Figure 3:
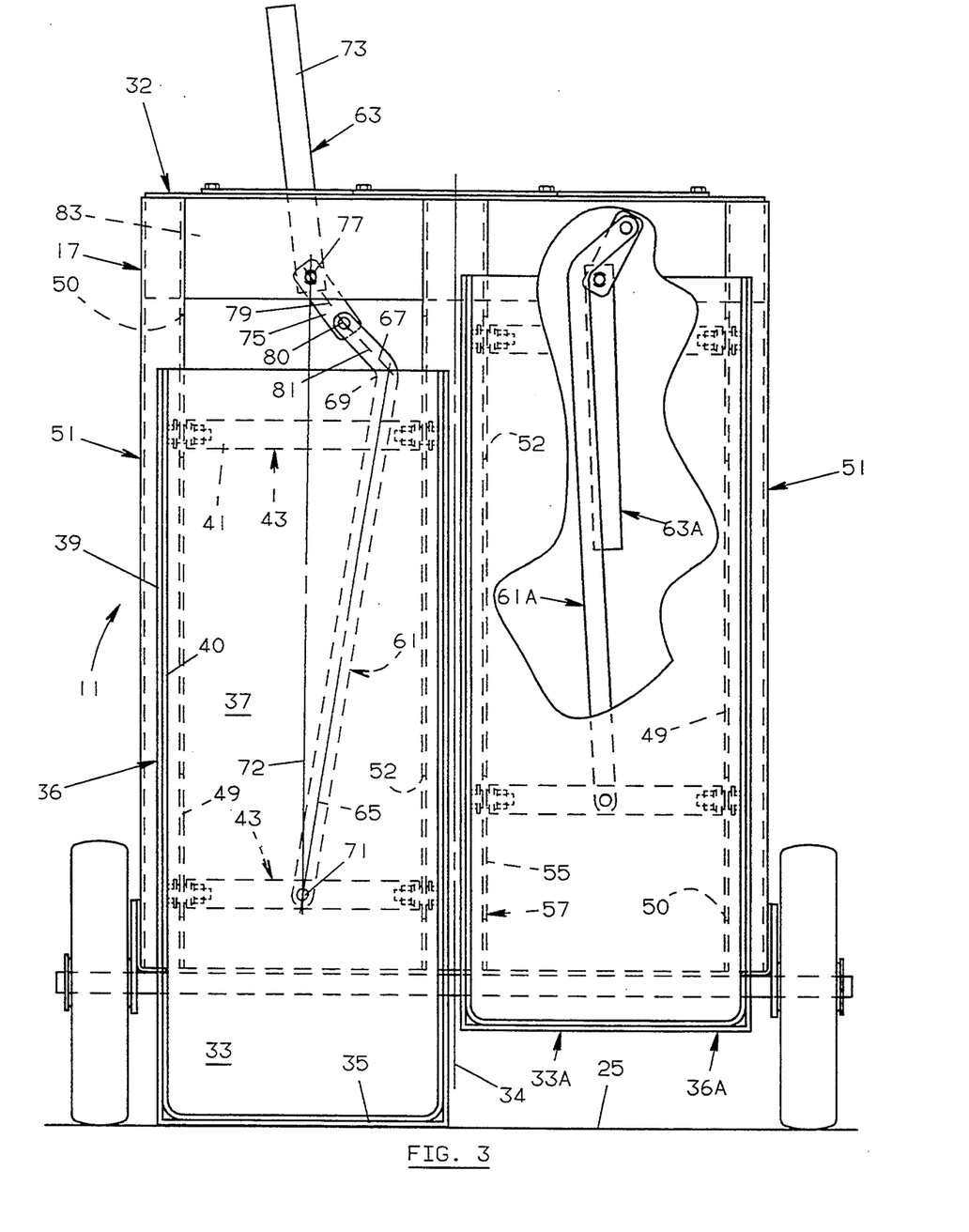
FIG. 3 is a partially broken front view of the gas cylinder lifting system of the present invention.
Figure 4:
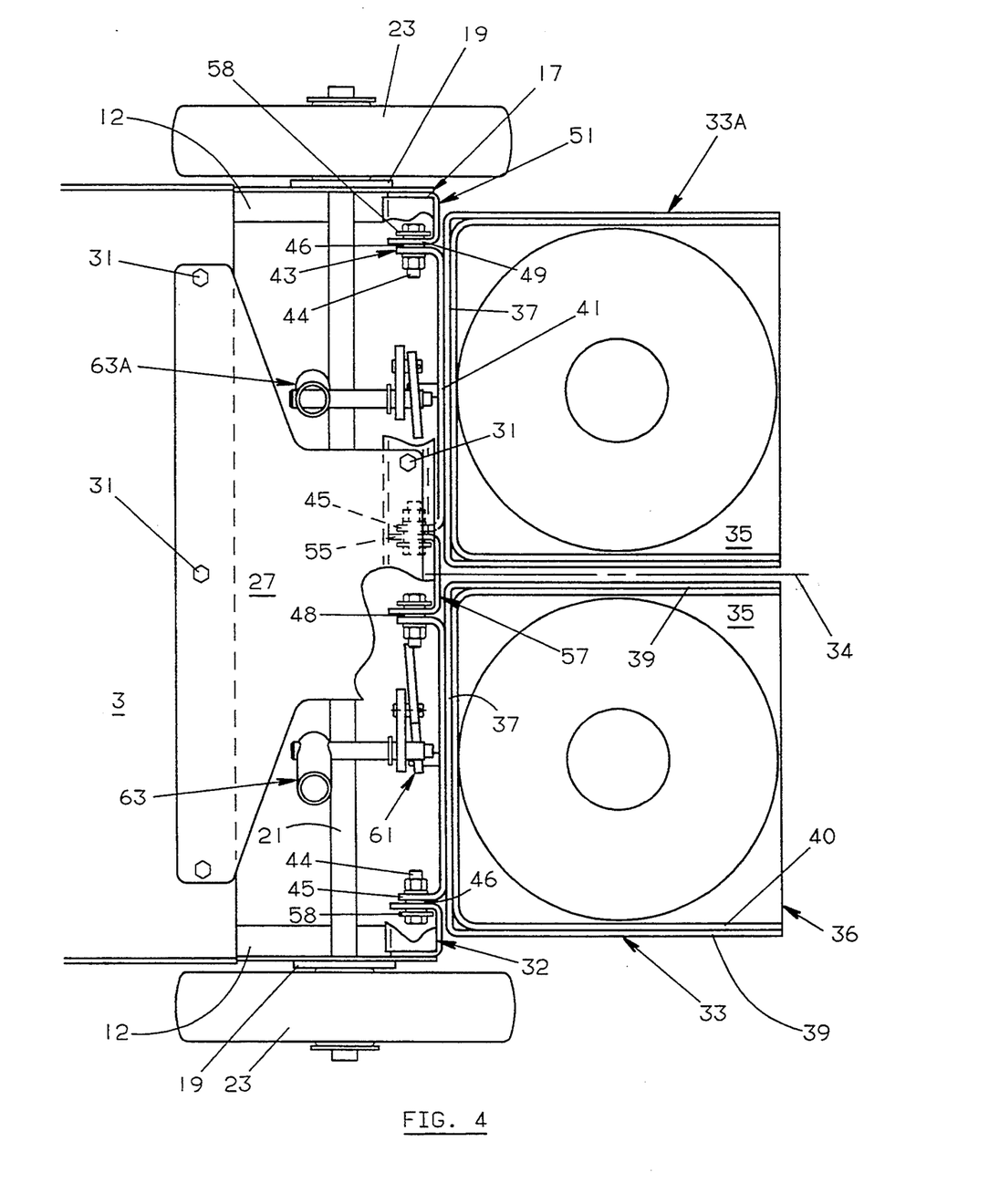
FIG. 4 is a partially broken top view on an enlarged scale of the gas cylinder lifting system of the present invention.

By way of example, and as best shown in FIGS. 3 and 4, the gas cylinder lifting system 11 comprises two slider-crank mechanisms 33, 33A mounted to a vertical frame 17. However, it will be understood that the gas cylinder lifting system may consist of only a single slider-crank mechanism 33, if desired. The vertical frame 17 has a pair of vertical outside guide channels 51 and a bottom end that is secured to the beams 12 of the running gear back unit 7. Each outside guide channel 51 has an inside leg 49 that is fabricated with a pair of vertically spaced slots 50. The vertical frame also has a center channel 57 with side legs 55. Each side leg 55 of the center channel 57 has two slots 52 that correspond to the slots 50 in the outside guide channels. To provide support for the upper end of the vertical frame 17, a tie bar 27 extends between and is attached to, as by screws 31, a top horizontal angle 3 of the vertical frame and the welding power supply 3.

The two slider-crank mechanisms 33, 33A have identical components, but those components are arranged symmetrically about a central vertical plane 34 passing through the welding power supply 3 and the vertical frame 17. Looking first at the slider-crank mechanism 33, it comprises a slider 36 that is constrained for vertical reciprocation within the vertical frame 17. In turn, the slider 36 comprises a horizontal pan 35 and a vertically extending plate 37. Preferably, gussets 39 are used to help support the pan 35 on the vertical plate 37. The pan 35, vertical plate 37, and gussets 39 may be lined with a liner 40 of synthetic material.

In the illustrated construction, the middle legs 41 of two strong support bars 43 are welded or otherwise secured to the vertical plate 37 of the slider 36. Assembled to end legs 45 of the support bars 43, as by screws and nuts 44, are pairs of bushings 46 and 48. The bushings 46 are captured and ride within the corresponding slots 50 in the side leg 49 of the outside guide channel 51. The slider bushings 48 are captured and ride within corresponding slots 52 in the side leg 55 of the center channel 57. The bushings and slots cooperate to prevent horizontal motion of the slider in directions parallel to the central plane 34, that is, motion to the left and right with respect to FIG. 2. Horizontal motion of the slider 36 in directions perpendicular to the central plane, i.e., to the left and right with respect to FIG. 3, is prevented by washers 58 associated with the screws and nuts 44 and the bushings 46 and 48. In that manner, the slider is constrained against all horizontal movement relative to the vertical frame 17. On the other hand, the slider is free for vertical translation along the outside and center guide channels. In the construction illustrated, the slider-crank mechanism 33A includes a slider 36A that is constrained to the vertical frame in the same manner and using the same components as the slider 36.

The slider-crank mechanism 33 further includes a linkage 61 and a crank lever 63. The linkage 61 has a first leg 65 that preferably is substantially longer than a second leg 67. The first and second linkage legs 65 and 67, respectively, make an obtuse angle relative to each other to form a crook 69. The free end of the linkage first leg is pivotally connected to the vertical plate 37 of the slider 36 by a slider pin 71.

The crank lever 63 has a relatively long handle 73 and a relatively short leg 75. The handle 73 and the short leg 75 make an obtuse angle relative to each other. The crank lever is rotatably connected to the vertical frame 17 by a pivot pin 77 that is located at the junction of the crank lever handle and the short leg. The pivot pin 77 is supported and restrained within a vertical plate 78 that depends from the angle 32 and by leg 83 of the angle 32. The pivot pin 77 and the slider pin 71 define a generally vertical plane 72. The free end of the crank lever short leg is pivotally connected to the free end of the linkage second leg 67 by a hinge pin 80.

In FIG. 3, the slider-crank mechanism 33 is shown such that the slider 36 is in a lowered location at which the slider pan 35 is on the ground 25. The crank lever 63 is then at a corresponding first angular position whereat its handle 73 is approximately vertical above the pivot pin 77. In that situation, the hinge pin 80 lies between the plane 72 and central plane 34, and the hinge pin lies between the pivot pin and the slider pin 71. The crook 69 of the linkage 61 also lies between the pivot pin and the slider pin. Also, the centerline 79 of the crank lever short leg 75 is approximately coplanar with the centerline 81 of the second leg 67 of the linkage 61.

To actuate the slider-crank mechanism 33 and raise the slider 36 to the raised location of the slider 36A of FIG. 3, the crank lever 63 is manually rotated about the pivot pin 77 in a counterclockwise direction with respect to FIG. 3. That action rotates and raises the hinge pin 80 and thus raises the entire linkage 61 and the slider 36. The slider raises approximately the same amount as the vertical distance traveled by the hinge pin. Rotation of the crank lever continues through an angle that is somewhat less than the obtuse angle between the crank lever handle 73 and the short leg 75 until the crank lever short leg is vertical above the pivot pin. At that point, the slider has raised a maximum amount from its lowered location. The pivot pin is then between the hinge pin and the slider pin, the crook 69 of the linkage 61 is approximately horizontally aligned with the pivot pin, and the hinge pin lies close to the plane 72. A slight further counterclockwise rotation of the crank lever rotates the hinge pin 80 to the opposite side of the plane 72 as the central plane 34 and causes the linkage crook 69 to approach and finally contact the pivot pin 77. The crank lever handle 73 is approximately vertical and below the pivot pin 77. No further counterclockwise crank lever rotation is then possible, and the slider-crank mechanism is in an over-center self-locked condition. That situation is shown by the slider-crank mechanism 33A of FIG. 3.

When the slider-crank mechanism 33A is in the over-center self-locked condition, a vertically downward force on the slider 36A merely serves to more securely lock the slider-crank mechanism 33A in place. The only way the slider 36A can be lowered is by deliberately rotating the crank lever 63A counterclockwise with respect to FIG. 3.

In operation, a welder rotates the crank lever associated with the desired slider-crank mechanism, such as crank lever 63, to the position approximately as shown on the left side of FIG. 3 until the pan 35 of the slider 36 rests on the floor 25. The welder can then easily tilt and roll a gas cylinder 9 onto the pan. A chain or strap 10 (FIGS. 1 and 2) is connected. Then the welder rotates the crank lever counterclockwise with respect to FIG. 3 to raise the slider 36 and the gas cylinder. The large mechanical advantage provided by the crank lever enables even the heaviest gas cylinders to be raised with modest manual effort. The crank lever is rotated until it reaches its over-center locked condition. At that point, the slider and gas cylinder are safely in the raised location, such as is shown on the right side of FIG. 3. The welder can then transport the running gear 1 and gas cylinder together to a job site.

Figure 5:
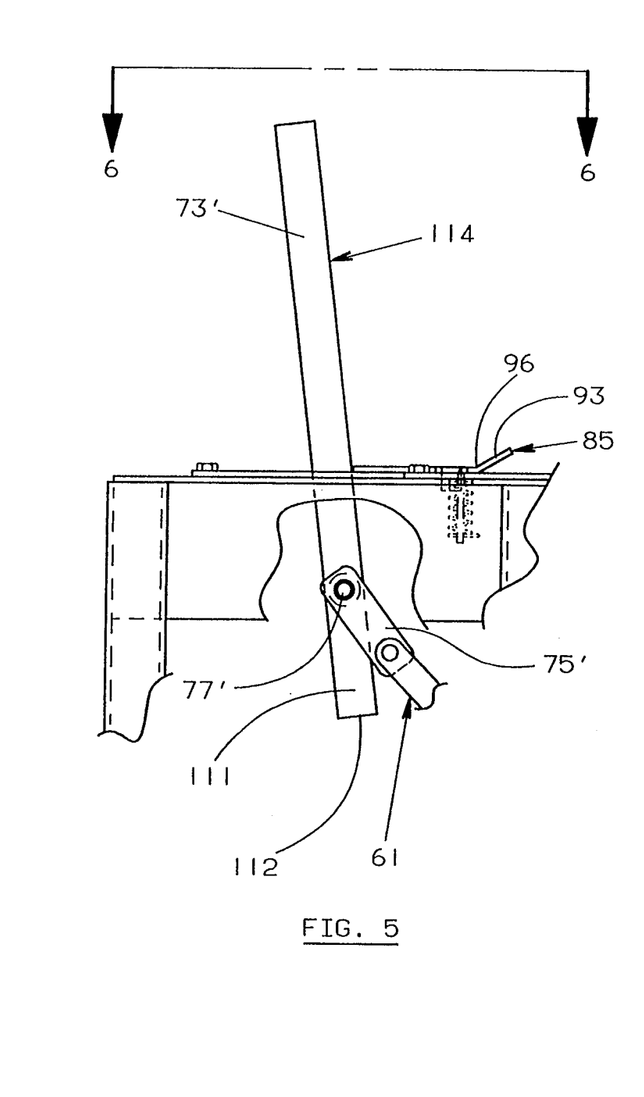
FIG. 5 is a partial front view of a modified gas cylinder lifting system that includes a positive stop.
Figure 6:
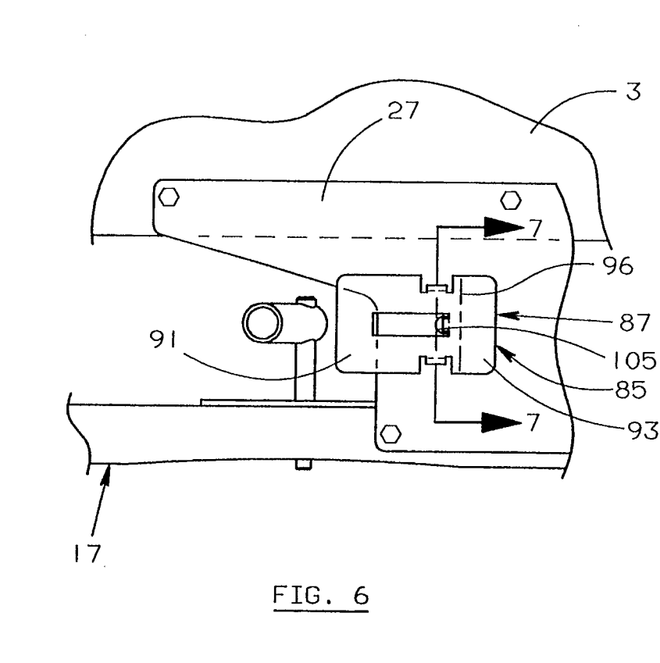
FIG. 6 is a view taken along line 6—6 of FIG. 5.
Figure 7:
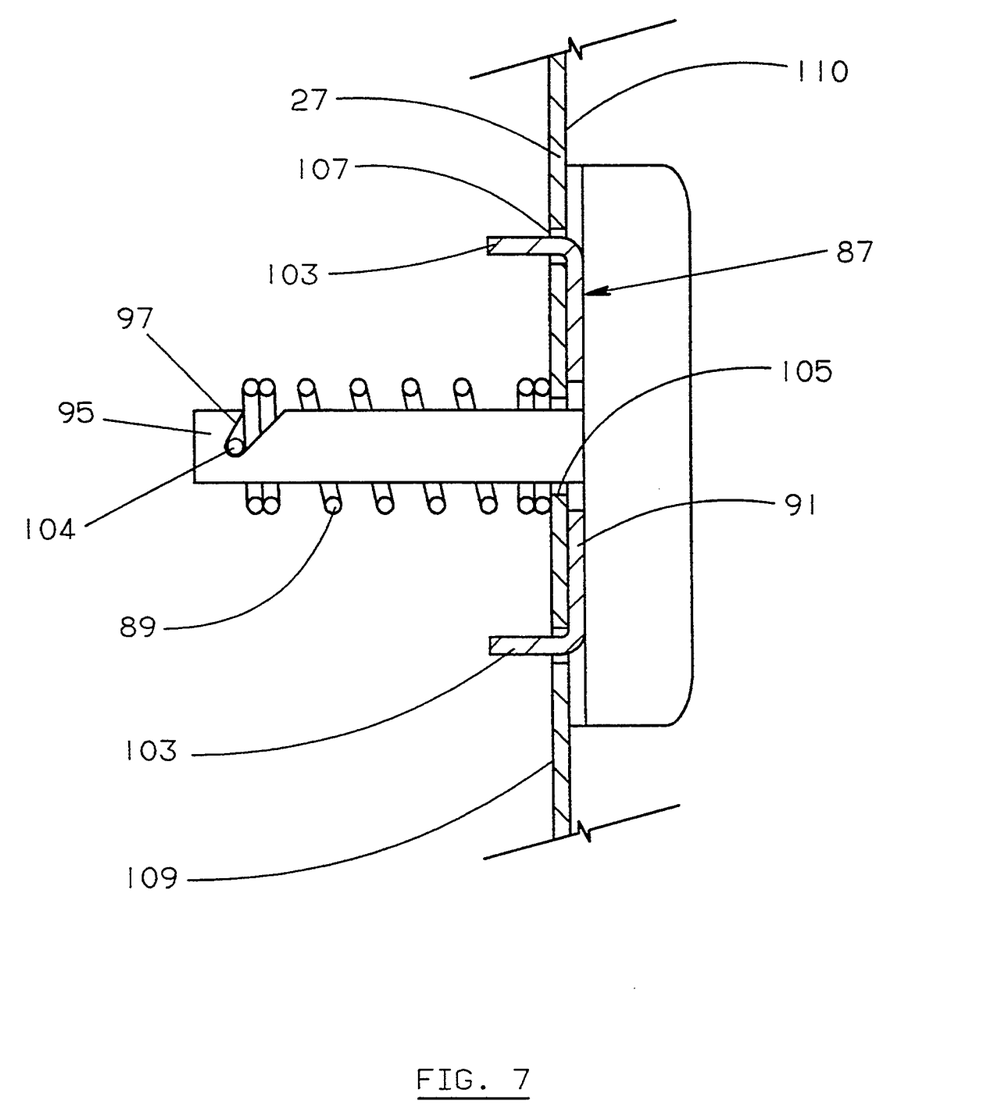
FIG. 7 is a cross sectional view on an enlarged scale taken along line 7—7 of FIG. 6.

Further in accordance with the present invention, a stop can be incorporated into the gas cylinder lifting system that positively maintains a slider and object at their raised location. Turning to FIGS. 5-7, a stop 85 is composed of a latch 87 and a compression spring 89. The latch 87 is formed with a first flat section 91 and a second flat section 93. The first and second sections 91 and 93, respectively, join each other along a junction 96 at an obtuse angle of approximately 135 degrees.

In the preferred embodiment, the interior of the first section 91 of the latch 87 is punched to create a strip 95. The strip 95 is bent at a right angle to the plane of the first section. The junction of the strip 95 with the latch first section 91 is close to the junction 96 of the latch first section with the second section 93. There is a notch or hole 97 near the free end of the strip 95. The latch further includes a pair of legs 103 that join to the first section and extend in the direction of the strip.

A hole 105 is punched in the bar 27 that joins the top end of the vertical frame 17 to the welding power supply 3. The hole 105 is large enough to accept the strip 95 of the latch 87. Two small slits 107 are also punched in the bar 27. The slits 107 are sized and located relative to the hole 105 to accept the legs 103 of the latch 87 when the latch strip is inserted through the hole 105.

One end of the wire of the spring 89 is bent into a diametrical section 104. The spring 89 is placed over the latch strip 95 and is compressed against the underside 109 of the bar 27. The spring is turned such that the diametrical section 104 enters the notch 97 in the latch strip 95. Upon releasing the spring, it is captured between the underside 109 of the bar 27 and the strip notch 97. The spring thus acts to hold the latch 87 in a normal condition whereat the latch first section 91 lies against the top surface 110 of the bar 27. However, by manually depressing the latch second section against the force of the spring, the latch can pivot about the junction 96.

When the stop 85 is incorporated into the gas cylinder lifting system, a modified crank lever 114 is required. The crank lever 114 has a handle 73' and a short leg 75' that are substantially identical to the handle 73 and short leg 75 of the crank lever 63 previously described in conjunction with FIGS. 2-4. Further, the crank lever 114 is rotationally connected to the frame 17 with a pivot pin 77' in the same manner as the connection using the pivot pin 77 of FIGS. 2-4. However, the crank lever 114 includes a handle extension 111 on the opposite side of the pivot pin 77' as the handle 73'. The handle extension 111 has a free end 112.

Figure 8:
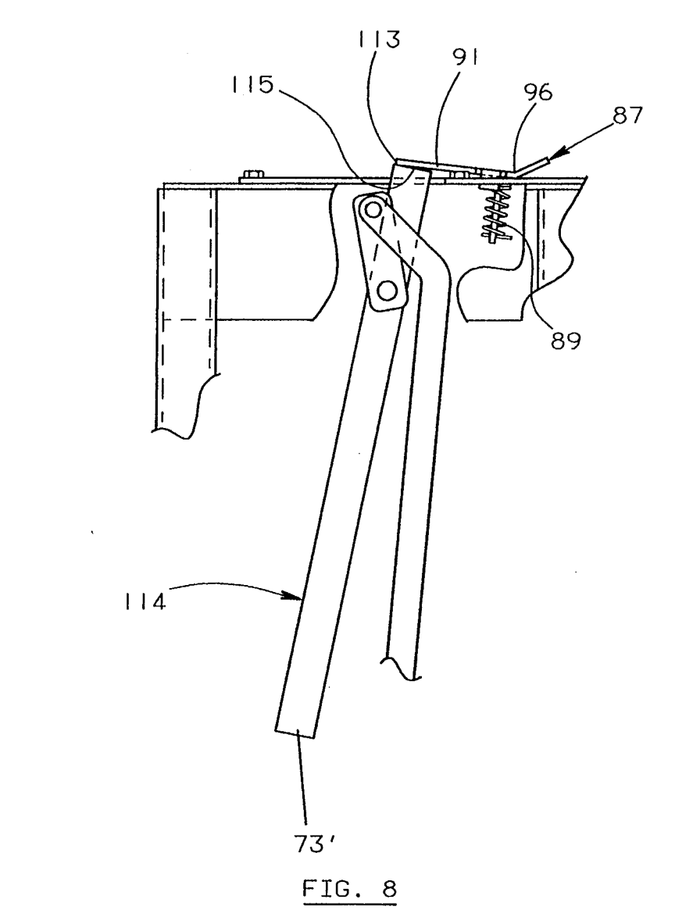
FIG. 8 is a view similar to FIG. 5, but showing the crank lever in contact with the stop.
Figure 9:
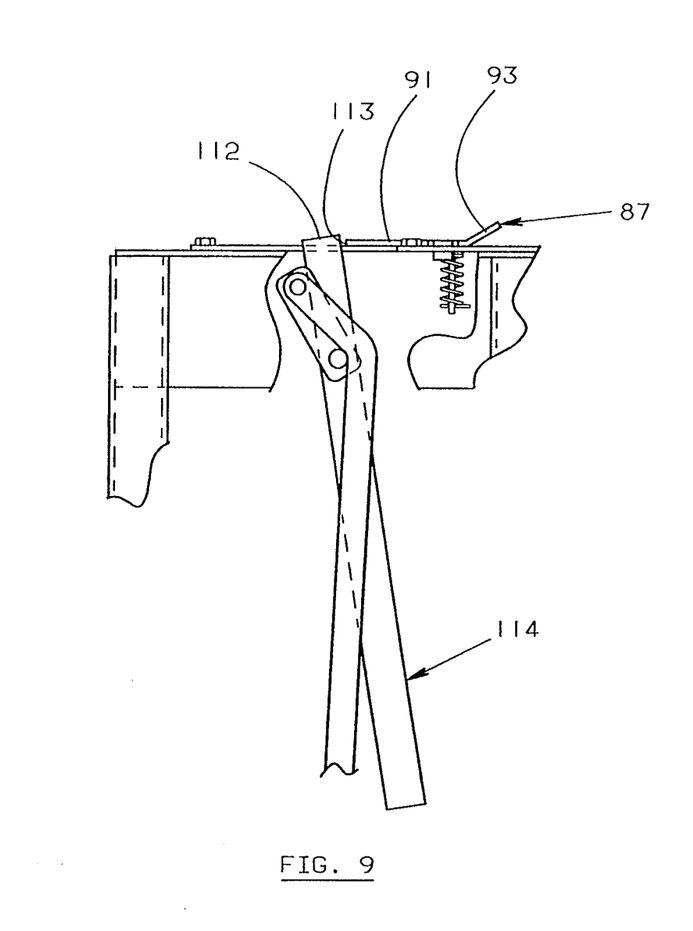
FIG. 9 is a view similar to FIG. 8, but showing the stop in position to positively maintain the crank lever at its second angular position.

FIG. 5 shows the crank lever 114 at a first angular position whereat the slider, not shown in FIG. 5, is at a corresponding lowered location. To translate the slider and any object on it to a raised location, the crank lever 114 is manually rotated in a counterclockwise direction with respect to FIG. 5, thereby raising the slider, FIG. 8. As the crank lever nears its second angular position, the free end 112 of the handle extension 111 contacts the underside 115 of the first section 91 of the latch 87. Continued rotation of the crank lever causes the handle extension end 112 to cam against and pivot the latch in a clockwise direction about the junction 96 out of the path of the handle extension. When the crank lever ultimately reaches its second angular position, FIG. 9, the handle free end 112 has passed the free end 113 of the latch first section 91, and the spring 89 snaps the latch back to its normal condition of FIG. 5. In that situation, the crank lever 114 is locked against rotation back toward its first angular position. As a consequence, the slider and any object on it are positively maintained in their raised location.

To lower the slider, a person manually depresses the second section 93 of the latch 87 to pivot the free end 113 of the latch first section 91 above the free end 112 of the handle extension 111. The crank lever 114 is then free to rotate clockwise with respect to FIG. 9 and thereby lower the slider. In some situations, the over-center self-locking feature of the gas cylinder lifting system previously described may be eliminated, and the stop 85 may be used as the exclusive mechanism for maintaining the slider and object at their raised location.

In summary, the results and advantages of welding power supply running gears 1 can now be more fully realized. The gas cylinder lifting system 11 of the present invention enables welders to load heavy gas cylinders 9 onto and to unload them from a running gear with ease. This desirable result comes from using the combined features of the slider, linkage, and crank lever. The slider provides a reciprocable support for a gas cylinder. The crank lever enables the slider to be actuated with ease. Selectively rotating the crank lever causes raising and lowering of the slider and of a gas cylinder supported on the slider. The gas cylinder lifting system is designed with an over-center self-locking feature that positively prevents unintentional lowering of the slider and gas cylinder. A stop can be incorporated into the gas cylinder lifting system that cooperates with the crank lever to positively prevent lowering of the slider from its raised location.

It will also be recognized that in addition to the superior performance of the gas cylinder lifting system 11, its construction is of very modest cost. Consequently, owners and users of welding equipment can incorporate the invention into welding power supplies 3 and running gears 1 for only small capital outlays.

Thus, it is apparent that there has been provided, in accordance with the invention, a gas cylinder lifting system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A gas cylinder lifting system for loading and unloading gas cylinders or the like onto and off of the running gear of a welding power supply comprising:
   a. a frame mounted on the running gear;
   b. slider means reciprocable on the frame for supporting a gas cylinder or the like thereon;
   c. a linkage pivotally connected to the slider means; and
   d. lever means rotatably connected to the frame and to the linkage for rotating along a path to selectively raise and lower the slider means.

2. The gas cylinder lifting system of claim 1 wherein:
   a. the slider means comprises;
      i. a plate;
      ii. a plurality of bushings;
      iii. means for assembling the bushings to the plate; and
      iv. pan means joined to the plate for supporting a gas cylinder or the like thereon; and
   b. the frame comprises guide means for guiding the bushings along the frame.

3. The gas cylinder lifting system of claim 1 wherein the linkage comprises:
   a. first and second legs that define respective longitudinal centerlines and that are joined to each other at an obtuse angle to define a crook therebetween; and
   b. a slider pin pivotally connecting the linkage first leg to the slider means.

4. The gas cylinder lifting system of claim 3 wherein the lever means comprises:
   a. a crank lever having a leg and a handle joined to each other at an obtuse angle, the crank lever leg being pivotally connected to the linkage second leg; and
   b. pivot means for rotatably connecting the junction of the handle and the leg to the frame.

5. The gas cylinder lifting system of claim 3 wherein the lever means comprises:
   a. a handle defining a first longitudinal centerline;
   b. a short leg defining a longitudinal centerline that makes an obtuse angle with the handle longitudinal centerline;
   c. a pivot pin rotatably mounting the junction of the handle and the short leg to the frame; and
   d. a hinge pin pivotally connecting the short leg to the linkage second leg.

6. The gas cylinder lifting system of claim 5 wherein the lever means is rotatable about the pivot pin to a first angular position whereat the crook of the linkage is remote from the pivot pin and whereat the slider means is at a lowered location, and to a second angular position whereat the crook of the linkage is adjacent the pivot pin and whereat the slider means is at a raised location.

7. The gas cylinder lifting system of claim 6 wherein:
   a. the slider pin and the pivot pin define a generally vertical plane;
   b. the hinge pin lies on a first side of the vertical plane when the lever means is in the first angular position thereof; and
   c. the hinge pin lies on the opposite side of the vertical plane when the lever means is in the second angular position thereof to thereby provide an over-center self-locked condition for the gas cylinder lifting system.

8. The gas cylinder lifting system of claim 1 further comprising stop means mounted to the frame for cooperating with the lever means to positively maintain the slider means at a raised location thereof.

9. The gas cylinder lifting system of claim 8 wherein:
   a. the stop means comprises:
      i. a latch pivotally installed in the frame; and
      ii. spring means for biasing the latch to a first condition whereat the latch lies in the path of the lever means;
   b. the latch is pivotable by the lever means to a second condition that enables the lever means to rotate past the latch in a first direction corresponding to raising the slider means; and
   c. the spring biases the latch to the first condition thereof when the lever means has rotated in the first direction past the latch to return the latch into the path of the lever means and positively prevent rotation of the lever means in a second direction corresponding to lowering the slider means.

10. In combination with a welding power supply running gear that rolls along a floor, a lift system comprising:
   a. a frame mounted to the running gear;
   b. a slider-crank mechanism mounted to the frame comprising:
      i. a slider constrained for vertical reciprocation on the frame and having a pan that supports a gas cylinder or the like; and
      ii. lever means rotatably connected to the frame and to the slider for rotating along a path between a first angular position whereat the slider is at a first location for loading a gas cylinder or the like unto or unloading a gas cylinder or the like from the slider, and a second angular position whereat the slider is at a second location for enabling the running gear to transport the gas cylinder along the floor;

c. a linkage having first and second legs joined to each other at an obtuse angle to thereby form a crook in the linkage;

d. a slider pin pivotally connecting the slider to the linkage first leg; and e. a hinge pin pivotally connecting the lever means to the linkage second leg.

11. The combination of claim 10 wherein:

a. the lever means comprises:
  i. a crank lever having a handle and a short leg joined to the handle at an obtuse angle; and
  ii. a pivot pin rotatably connecting the crank lever to the frame at the junction of the handle and the short leg; and
b. the hinge pin connects the linkage second leg to the crank lever short leg.

12. The combination of claim 11 wherein:

a. the slider pin and the pivot pin define a generally vertical plane;
b. the hinge pin lies on a first side of the vertical plane when the lever means is in the first angular position thereof; and
c. the hinge pin lies on a second side of the vertical plane when the lever means is in the second angular position thereof.

13. The combination of claim 11 wherein:

a. the crook of the linkage is remote from the pivot pin when the lever means is in the first angular position thereof; and
b. the crook of the linkage is adjacent the pivot pin when the lever means is in the second angular position thereof.

14. The combination of claim 10 wherein the linkage first leg is substantially longer than the linkage second leg.

15. The combination of claim 10 further comprising:

a. latch means pivotally installed on the frame in the path of the lever means for being contacted by the lever means and pivoted thereby out of the path thereof when the lever means is rotated from the first to the second angular positions thereof; and
b. biasing means for pivoting the latch means back into the path of the lever means when the lever means is in the second angular position thereof to prevent rotation of the lever means from the second to the first angular position thereof.

16. Apparatus for raising and lowering a heavy object comprising:

a. a slider constrained for vertical motion within a frame and having a horizontal pan that supports the object;
b. a crank lever having a handle and a short leg that are joined to each other at a junction;
c. a pivot pin for rotatably connecting the lever junction to the frame;
d. an elongated linkage having first and second ends;
e. a slider pin pivotally connecting the slider to the linkage first end at a location generally vertically aligned with the pivot pin; and
f. a hinge pin pivotally connecting the crank lever short leg to the linkage second end, so that a person can rotate the crank lever by means of the handle thereof to raise and lower the linkage and thereby raise and lower the slider.

17. The apparatus of claim 16 wherein:

a. the handle and short leg of the crank lever make an obtuse angle with each other;
b. the linkage has first and second legs that make an obtuse angle with each other to thereby form a crook therebetween; and
c. the crank lever is rotatable between a first angular position whereat the crook of the linkage is remote from the pivot pin and the slider and object are at a lowered location.

18. The combination of claim 17 wherein the crank lever is rotatable to a second angular position whereat the crook of the linkage is adjacent the pivot pin and the slider and object are at a raised location.

19. The apparatus of claim 18 wherein the crank lever handle lies generally alongside the linkage first leg when the crank lever is in the second angular position thereof.

20. The apparatus of claim 18 wherein:

a. the slider pin and the pivot pin define a generally vertical plane;
b. the hinge pin lies on a first side of the vertical plane when the crank lever is in the first angular position thereof; and
c. the hinge pin lies on a second side of the vertical plane when the crank lever is in the second angular position thereof.

21. The apparatus of claim 17 wherein:

a. the crank lever short leg and the linkage second leg define respective longitudinal centerlines; and
b. the longitudinal centerlines of the crank lever short leg and the linkage second leg are generally coplanar when the crank lever is in the first angular position thereof.

22. The apparatus of claim 16 further comprising:

a. extension means on the crank lever for rotating about a path when the crank lever is rotated;
b. a latch pivotally installed on the frame and having first and second sections joined to each other at a junction; and
c. spring means for biasing the latch to a first condition whereat the latch first section is in the path of the extension means and is contacted thereby and pivoted out of the path thereof as the crank lever is rotated to raise the slider to a raised location, and for pivoting the latch first section back into the path of the extension means when the crank lever has been rotated to raise the slider to the raised location thereof, so that the latch positively prevents rotation of the crank lever to lower the slider from the raised location thereof.

23. A method of lifting and lowering an object comprising the steps of:

a. constraining a slider for vertical reciprocation within a frame;
b. providing a linkage having first and second legs that define respective longitudinal centerlines and that having a crook between the first and second legs;
c. pivotally connecting the linkage first leg to the slider;
d. rotatably connecting the fulcrum of a lever to the frame;
e. pivotally connecting the lever to the linkage second leg;
f. rotating the lever to a first angular position whereat the slider is at a lowered location and the linkage crook is remote from the lever fulcrum; and g. rotating the lever to a second angular position whereat the slide is in a raised location and the linkage crook is adjacent the lever fulcrum.

24. The method of claim 23 wherein:
 a. the step of providing a linkage comprises the step of providing a linkage having the first leg thereof substantially longer than the second leg thereof; and
 b. the step of rotatably connecting the fulcrum of a lever to the frame comprises the steps of:
  i. providing a crank lever having a short leg joined to a handle with the handle being substantially longer than the short leg;
  ii. forming a fulcrum at the junction of the crank lever handle and short leg; and
  iii. rotatably connecting the crank lever fulcrum to the frame at a location generally vertically above the location of the connection of the linkage first leg to the slider.

25. The method of claim 24 wherein the step of pivotally connecting the lever to the linkage comprises of step of pivotally connecting the crank lever short leg to the linkage second leg with the linkage second leg and the crank lever short leg being generally coplanar when the lever is in the first angular position thereof.

26. The method of claim 24 wherein:
 a. the step of rotating the lever to a first angular position comprises the step of pivoting the connection between the lever and the linkage to a first side of a plane passing through the lever fulcrum and the connection between the linkage first leg and the slider; and
 b. the step of rotating the lever to a second angular position comprises the step of pivoting the connection between the lever and the linkage to a second side of the plane passing through the lever fulcrum and the connection between the linkage first leg and the slider and thereby placing the lever and linkage in an over-center self-locked condition.

27. The method of claim 24 comprising the further steps of:
 a. providing an extension having a free end on the crank lever that defines a path when the crank lever is rotated;
 b. installing a latch in the path of the crank lever extension;
 c. pivoting the latch by the extension free end to a condition that allows the crank lever to be rotated from the first to the second angular position thereof; and
 d. returning the latch into the path of the extension when the crank lever is in the second angular position thereof and thereby positively maintaining the crank lever at the second angular position thereof.

* * * * *